Jan. 20, 1970   E. P. SWINNEY   3,490,417

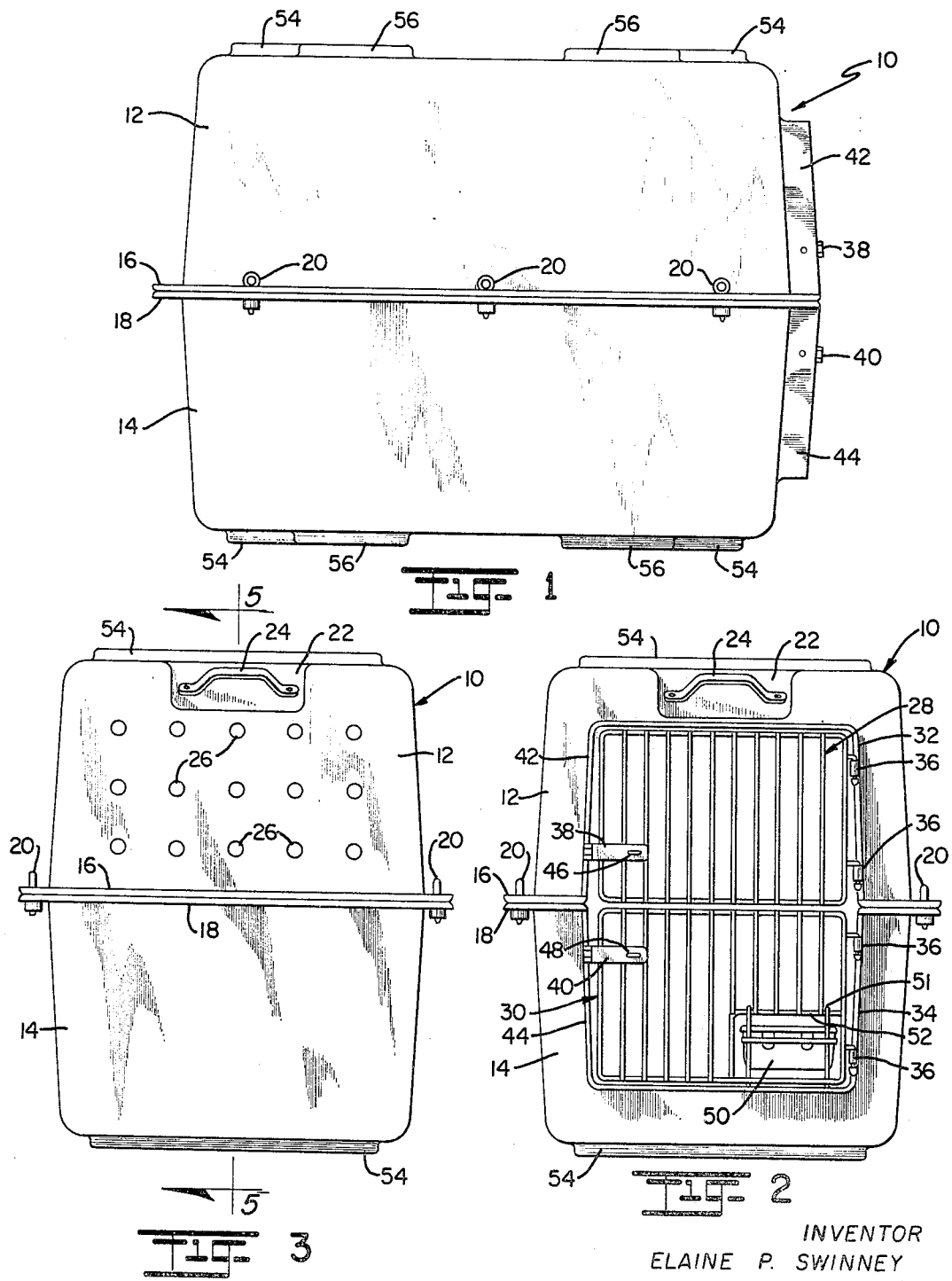

COMBINATION SHIPPING AND LIVING COMPARTMENT FOR ANIMALS

Filed July 31, 1967   3 Sheets-Sheet 2

INVENTOR
ELAINE P. SWINNEY
BY
*Sheridan & Ross*
ATTORNEYS

Jan. 20, 1970     E. P. SWINNEY     3,490,417
COMBINATION SHIPPING AND LIVING COMPARTMENT FOR ANIMALS
Filed July 31, 1967     3 Sheets-Sheet 3
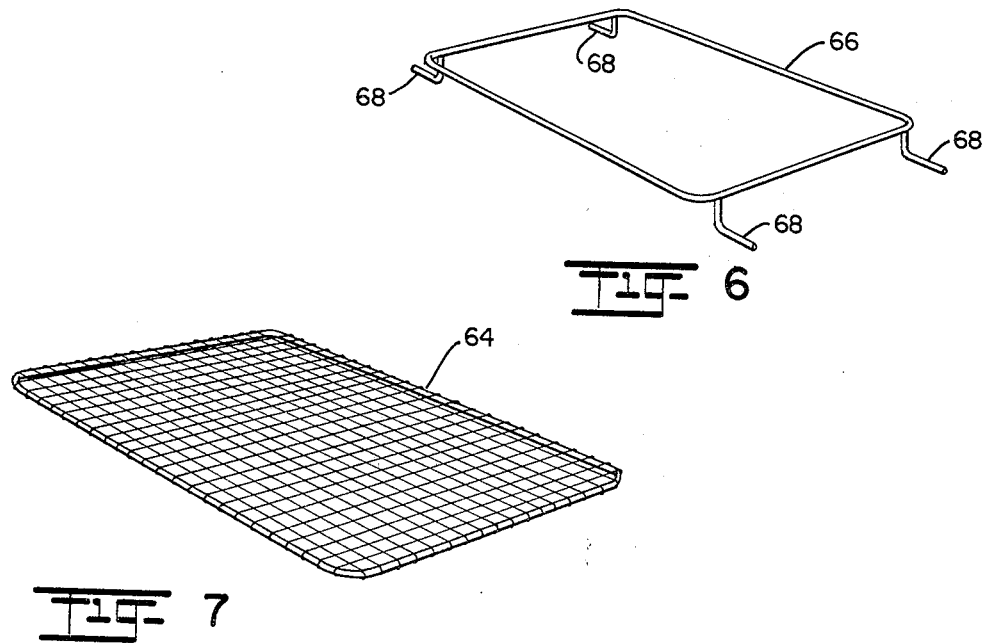
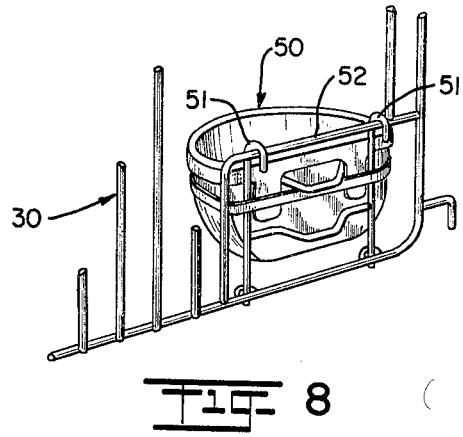
INVENTOR
ELAINE P. SWINNEY
BY
*Sheridan & Ross*
ATTORNEYS

United States Patent Office 3,490,417
Patented Jan. 20, 1970

3,490,417
COMBINATION SHIPPING AND LIVING
COMPARTMENT FOR ANIMALS
Elaine P. Swinney, 3700 S. Garrison St.,
Denver, Colo.
Filed July 31, 1967, Ser. No. 657,352
Int. Cl. A01k 1/02
U.S. Cl. 119—19      4 Claims

ABSTRACT OF THE DISCLOSURE

The invention is a combination shipping crate and living compartment for animals comprising upper and lower open-ended sections adapted to be secured together to form a composite structure, the sections constructed to be molded in the same mold when made of plastic or other moldable material, each section being provided with a pattern of reinforcing ribs in its closed end which serve as combined horizontal and lateral rigidity and strength imparting members, as interlocking members to prevent relative movement between stacked units, and as supports for an internal slatted or perforated floor, the recesses formed by making the ribs serving as receptacles for accumulation within the compartment. An alternate improvement modification is the inclusion of a whelping guard rail supported above the floor to prevent injury to offspring by the mother during whelping and while the young are small.

Summary of the invention

This invention relates to a combination shipping and living compartment for animals.

The large scale production of dogs, cats, and other pets, and worldwide shipment of them to customers by air freight, express, etc. has created a demand for suitable shipping compartments in which to transport the animals over a period of several days or even weeks. Experience over the years has demonstrated the need for certain requirements for a suitable structure.

First of all, since a shipping container is relatively expensive, and generally only one animal at a time can be shipped in a crate, it is important for economic reasons that the structure be durable so that it can be used repeatedly, and that it be adaptable as a living compartment for the animal for an indefinite period when it is not being used as a shipping compartment. The compartment must meet safety requirements, such as proper ventilation, and must be constructed so that it can be easily cleaned. Its construction should permit its ready movement from place to place by a single individual. As space in express, air freight, and other shipping accomodations is always at a premium, the compartment should be compact and have a contruction which permits stacking without relative movement between stacked compartments. Further, it should be susceptible of manufacture by rapid and economical manufacturing procedures.

Accordingly, it is an object of this invention to provide a portable compartment for animals which can be used as a shipping crate or living compartment.

It is another object of this invention to provide a combination shipping and living compartment for animals which is of strong and rugged construction and which can be made by simple and relatively inexpensive manufacturing techniques.

It is another obkject of this invention to provide a combination shipping and living compartment for animals which is adequately ventilated to protect the safety of the animal, and which can be easily and rapidly cleaned.

It is another object of this invention to provide a combination shipping and living compartment having a structure which permits stacking with a like compartment with insurance that relative movement will not occur between the stacked compartments.

It is another object of this invention to provide a combination shipping and living compartment for animals in which rigid horizontal and lateral reinforcement of the ends of the compartment is provided by a pattern of reinforcing ribs which also serve an interlocking function to permit relative movement between stacked compartments, and which form internal ribs serving a support function in supporting a flooring internally of the compartment.

It is another object of this invention to provide a combination shipping and living compartment for animals constructed to provide safeguards against injury of newborn animals by the mother during whelping and while the animals are small.

It is a further object of this invention to provide an assembly section for assembly into a two-section combination shipping and living compartment for animals, which can be molded with the same mold, the section being capable of nesting with a like section.

The combination shipping and living animal compartment of the invention comprises a composite structure comprised of upper and lower open-ended sections of the same dimensions and substantially the same construction before the addition of doors, handles, etc., so that they can be made in the same mold, the assembly section having constructed in its closed end a pattern of reinforcing ribs which provide horizontal and lateral reinforcement, and which interlock with ribs in a corresponding pattern in a like compartment when the two compartments are stacked, the internally upstanding areas between the ribs providing an internal support for a slatted or perforated floor. After molding and before assembly of two sections as upper and lower sections, corresponding doors are mounted in the open end of the sections which become the upper and lower sections of the assembled compartment. The sections are constructed of moldable plastic and have rounded corners to provide greater strength, and other important safety and ventilation features as will be pointed out hereinafter.

The invention is best explained as set forth below by reference to the accompanying drawings in which:

FIG. 1 is a side elevational view of the assembled, composite shipping and living compartment of the invention;

FIG. 2 is an elevational view of the end of the compartment on which the doors are mounted;

FIG. 3 is an elevational view of the other end of the compartment;

FIG. 6 is a perspective view of the whelping guard rail;

FIG. 7 is a perspective view of the floor screen, and

FIG. 8 is a perspective view of the feeding tray showing a fragmentary section of the door on which it is mounted.

Figure 5:
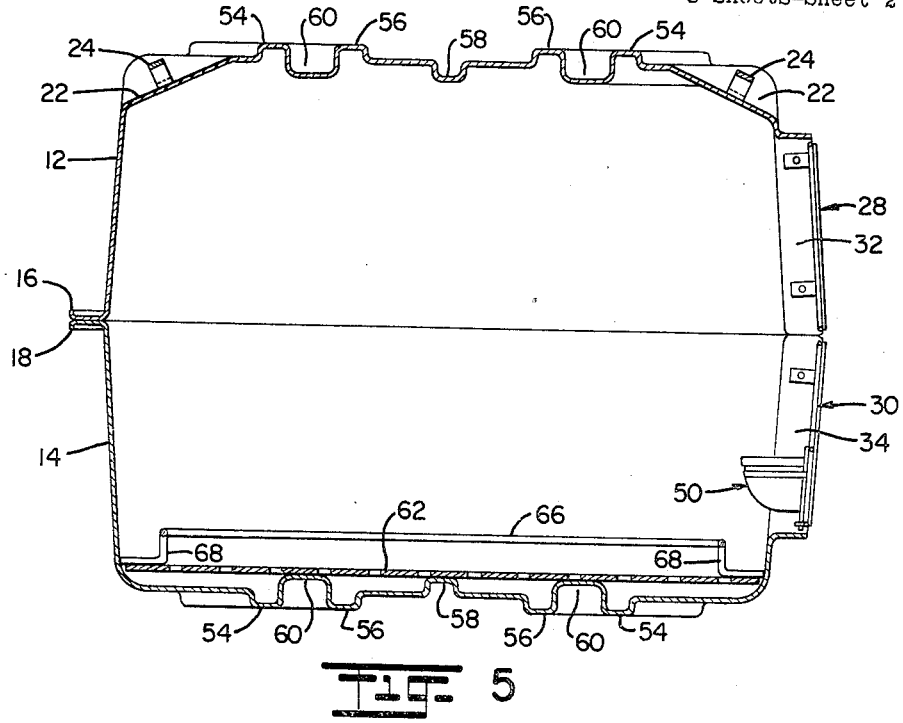
FIG. 5 is a vertical longitudinal cross-section of the compartment taken on the line 5—5 of FIG. 3.

In FIG. 1 there is shown a composite compartment 10 comprised of an upper open-ended section 12 and a lower open-ended section 14. The upper and lower sections 12 and 14 are each provided with circumferential mating flanges 16 and 18, respectively. The sections are fastened together by fastenings 20 extending through mating flanges as shown. These fasteners are constructed to enable easy fastening and unfastening. Various type fasteners may be used, including ordinary bolts, screws, studs, etc. The sections in this instance are made of moldable plastic; however, they may be made of other suitable materials, such as light metals.

As shown in FIG. 3, the upper section 12 is constructed with handle recesses 22 at either end in which are secured handles 24 for transporting the assembled crate or compartment. Other than the recesses for the handles, the upper and lower sections are of identical construction when they are first made. The sections are made with the same mold, thus making it possible to manufacture large numbers of the sections relatively inexpensively. In molding the upper section 12, a block of solid material is positioned in the mold to "block out" the recesses 22 at either end.

In making the assembled compartment or crate, ventilation holes 26 are formed in the rear end of the upper section. Other suitable ventilation means may be used. Following this, upper and lower ventilation and access doors 28 and 30, respectively, are suspended to the upper and lower facings 32 and 34, respectively, by means of conventional hinges 36. The doors 28 and 30 are constructed with vertical spaced bars but may be constructed with screens or other suitable ventilation means. Hasps 38 and 40 hingedly attached to facings 42 and 44, respectively, and cooperating with staples 46 and 48 may be provided for upper and lower doors, respectively. Other suitable means for fastening the doors may be used. For receiving food for feeding an animal enclosed in the compartment, a feeding tray 50 (FIG. 8) may be mounted by hooks 51, as shown, or by other convenient means, to cross bar 52 in a cut-out portion in the lower right hand corner of door 30. An alternate means for supplying food and water to the animal is the use of a small hinged door.

Figure 4:
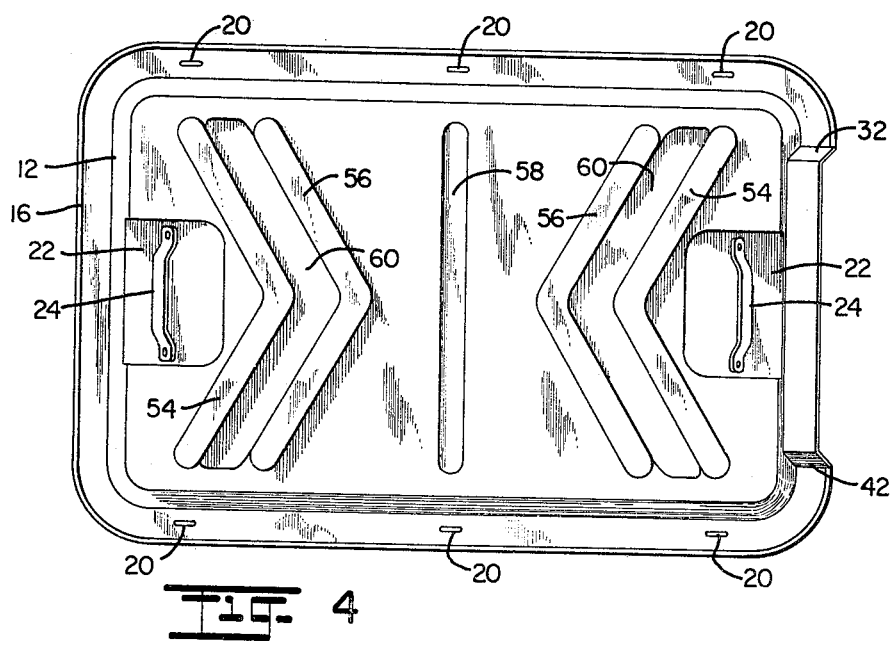
FIG. 4 is a top plan view of the compartment.

An important feature of the invention is the manner in which combined reinforcement and compartment interlocking means are provided in the closed bottom of the sections making up the composite compartment. In the molding operation, substantially transverse, hollow, outwardly facing ribs 54 and 56 (FIGS. 4 and 5) are molded on either end of the center of the bottom of the sections. The ribs 54 and 56 are constructed in the form of an angle as shown. The angle, of course, may be varied and it may face inwardly or outwardly. An internally extending straight central rib 58 of substantially the same cross-section as the ribs 54 and 56 is also molded into the closed bottom of each section to complete the pattern. The reinforcement rib pattern provides longitudinal and lateral rigidity to the structure throughout. The rib pattern for both sections is identical, and the angular ribs 54 and 56 are spaced apart a distance at least as great as the width of the ribs so that when one composite compartment is stacked on top of the other, the ribs will interlock to prevent relative movement between the stacked compartments. It can be seen from FIG. 5 that the pattern of reinforcing ribs provides a corrugated wall having outward projections 54 and 56 and inward projections 58 and 60 with internal recesses formed between the projections.

For comfortably supporting the animal above the corrugated internal surface, a removable slatted or perforated floor 62 is supported on the internal projections 58 and 60. The floor 62 is preferably made of perforated material or of slats so that openings are provided to permit accumulation to drop in the recesses below. The floor may be made of wood, plastic, light metal or other suitable material. Instead of the perforated or slatted floor a screen floor 64 (FIG. 7) may be used. To clean the compartment it is only necessary to remove the removable floor and hose out the compartment with water. If necessary, the sections can be separated and cleaned.

During the whelping period, a peripheral guard rail 66 (FIG. 6) is supported on top of floor 62 by means of legs 68 or other suitable means. This guard rail insures that the newborn animal will drop between the guard rail and the inner wall of the compartment so that it will not be mashed by the mother's body. The guard rail modification is an additional safety feature of the invention.

The sections 12 and 14 are molded with rounded corners throughout to provide additional strength features and to prevent sharp corners which might cause injury to individuals carrying the crates. The sections nest with each other so that as many as a dozen can be nested together so that a minimum storage space is required when they are not in use.

An alternate modification is a welded or meshed wire upper section mating with lower section 14 to replace upper section 12 under conditions where more ventilation is required. Preferably this open mesh upper section is of slightly smaller dimensions than the lower section to which it is mated so that an upper section 12 can be fitted over it to form an assembled compartment. This gives the user the option of using a top section 12 or a more ventilated open mesh top section by merely removing the top section 12 off the open mesh section. The open mesh section can, of course, be provided with doors and handles similar to those of section 12.

It will be seen from the above description, that a lightweight, high strength, well ventilated compartment which can be easily cleaned has been provided by the invention. The compartment is made of nestable sections of like dimensions which can be molded in the same mold, thus substantially reducing the manufacturing cost of the overall composite compartment. The compartment is so constructed that drafts of ventilating air in the area where the animal is located are prevented. The identical sections are provided with reinforcing ribs which have a number of advantages. First of all, the ribs provide longitudinal and lateral rigidity to the compartment, thus insuring extended use of each compartment before it wears out. Secondly, the ribs provide an interlocking function to lock stacked crates together to prevent relative movement between them, thus providing for conservation of storage space when the compartments are stored or shipped. Thirdly, the inwardly directed ribs 58 and 60 support the removable floors above recesses into which accumulation may drop, thus insuring a sanitary place for the animal to live at all times. A modification is the use of a guard rail 70 to insure the safety of newborn animals.

It is thus seen that the invention provides a lightweight, high strength, mobile, well ventilated and sanitary compartment or crate comprised of two assembled sections which can be made with the same mold. The compartment can be easily cleaned and is provided with a safety feature to preserve the life of newborn animals. The assembled compartments may be readily stacked one on top of the other without the possibility of relative movement therebetween. The compartment is so constructed that the animal can be readily fed and the compartment can be used as a permanent living area for the animal during inclement weather, and at all times.

What is claimed is:

1. A shipping crate or compartment for an animal comprising: upper and lower open-ended sections of the same dimensions sloping outwardly from the bottom or end secured together by mating peripheral flanges extending outwardly from the periphery of each respective open end, the assembly of the two sections forming a composite compartment comprised of a front, rear, sides, top and bottom; said top and bottom having a plurality of spaced-apart angle-shaped outwardly extending, substantially transverse reinforcing ribs forming a corrugated structure of inwardly and outwardly extending ridges; and a floor supported internally of said container on said inwardly extending ridges; the pattern of the ribs on said sections corresponding so that said ribs interlock to prevent relative lateral and longitudinal movement between two composite crates when one is stacked on top of the other.

2. The shipping crate of claim 1 including a guard rail supported above said floor and extending around the periphery of said floor.

3. The shipping crate of claim 1 in which the pattern of said reinforcing ribs includes a substantially straight transverse central rib with a plurality of angled ribs located on each side thereof.

4. A shipping crate or compartment for an animal comprising: upper and lower open-ended sections of the same dimensions sloping outwardly from the bottom or end secured together by mating peripheral flnages extending outwardly from the periphery of each respective open end, the assembly of the two sections forming a composite compartment comprised of a front, rear, sides, top and bottom; said top and bottom each having a central outwardly extending transverse rib and a plurality of spaced-apart angle-shaped outwardly extending, substantially transverse reinforcing ribs on either side of said central rib, said ribs forming a corrugated structure of inwardly and outwardly extending ridges; a floor supported internally of said container on said inwardly extending ridges, and a guard rail supported above said floor; the pattern of the ribs on said sections corresponding so that said ribs interlock to prevent relative lateral and longitudinal movement between two composite crates when one is stacked on top of the other.

References Cited

UNITED STATES PATENTS

| | | | |
|---|---|---|---|
| 3,195,505 | 7/1965 | Hauth et al. | 119—17 |
| 3,310,031 | 3/1967 | Lowe | 119—1 |
| 3,346,137 | 10/1967 | Ricci | 220—97 X |
| 3,407,961 | 10/1968 | Box | 220—97 |

HUGH R. CHAMBLEE, Primary Examiner

U.S. Cl. X.R.

220—97